(12) United States Patent
Takahashi

(10) Patent No.: US 7,123,935 B2
(45) Date of Patent: Oct. 17, 2006

(54) COMMUNICATION DEVICE, IMAGING DEVICE, COMMUNICATION METHOD, AND RECORDING MEDIUM STORING PROGRAM TO EXECUTE COMMUNICATION METHOD IN COMPUTER READABLE STATE

(75) Inventor: Takumi Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 907 days.

(21) Appl. No.: 09/957,248

(22) Filed: Sep. 21, 2001

(65) Prior Publication Data

US 2002/0037743 A1 Mar. 28, 2002

(30) Foreign Application Priority Data

Sep. 25, 2000 (JP) .............................. 2000-291165
Sep. 17, 2001 (JP) .............................. 2001-282068

(51) Int. Cl.
*H04M 1/00* (2006.01)

(52) U.S. Cl. ................ 455/556.1; 455/426.1; 455/517; 348/14.02; 348/207.1

(58) Field of Classification Search ........... 348/14.12, 348/14.02, 207.1, 239, 222.1, 333.05; 455/556.1, 455/556.2, 517, 426.1

See application file for complete search history.

(56) References Cited

U.S. PATENT DOCUMENTS

| | | | |
|---|---|---|---|
| 4,953,405 A | 9/1990 | Hara et al. | 73/602 |
| 5,301,552 A | 4/1994 | Nagura et al. | 73/606 |
| 5,381,693 A | 1/1995 | Kobayashi et al. | 73/614 |
| 5,410,591 A | 4/1995 | Takahashi | 379/201 |
| 5,838,886 A | 11/1998 | Takahashi et al. | 395/112 |
| 6,359,837 B1 * | 3/2002 | Tsukamoto | 368/10 |

FOREIGN PATENT DOCUMENTS

| | | | |
|---|---|---|---|
| GB | 2 335 816 | | 9/1999 |
| JP | 08-204886 | * | 8/1996 |
| JP | 409205396 A | * | 8/1997 |
| JP | 10-210392 | * | 8/1998 |
| JP | 11-341454 | | 12/1999 |

* cited by examiner

*Primary Examiner*—Melur Ramakrishnaiah
(74) *Attorney, Agent, or Firm*—Fitzpatrick, Cella, Harper & Scinto

(57) ABSTRACT

When a communication device transmit search information to an imaging device to request search of image data, the imaging device performs search of stored image data based on the received search information. Then, the communication device receives the image data searched by the imaging device and can display the data.

14 Claims, 7 Drawing Sheets

MEMORY FOR STORING ADDRESS OF IMAGING DEVICE 100

IMAGE INFORMATION FORMAT OF IMAGING DEVICE 100

COMMUNICATION DEVICE, IMAGING DEVICE, COMMUNICATION METHOD, AND RECORDING MEDIUM STORING PROGRAM TO EXECUTE COMMUNICATION METHOD IN COMPUTER READABLE STATE

BACKGROUND OF THE INVENTION

1. Field of the Invention

The present invention relates to data communication using an imaging device and a communication device.

2. Related Background Art

In recent years, a portable radio communication device having a telephone function has spread due to the progress of semiconductor technology and the like, and every person has come to own the portable radio communication device. Accordingly, communication using a telephone is changing form a Call to Number to a Call to Person. Many of the portable radio communication devices have realized an E-mail function and a simple Web browser function in addition to voice call.

Therefore, an imaging function of an image and its communication function are considered to be more important when taking into consideration that the communication capability of a next generation portable radio communication device is improved.

Further, transmission of image data shot by a digital camera via the portable radio communication device has been on trial, and its practicability has further improved due to the improvement of communication speed and the high image quality of the digital camera.

In fact, the performance of the digital camera has significantly improved in recent years, and an image can be shot with the image quality similar to that of a silver halide camera (a camera using a silver halide film) if the image is printed in a so-called L-size. Accordingly, the data communication by using the digital camera and the portable radio communication device is far more efficient than the case where the silver halide camera is used to shoot the image, development and printing are performed in a photofinishing laboratory, and the image obtained in this manner is read out by a scanner to make the image to be digital data and transferred, considering time and work required.

In addition, as described above, performing the image communication using the digital camera and the portable radio communication device meets the direction of a contemporary society that is the diversity and a multimedia of communication demand.

However, the foregoing data communication system only transmits/receives the image data by communication between devices in the case of transmission and receiving between the digital camera and the portable radio communication device and network communication between the portable radio communication devices, and the portable radio communication device could not search the image data stored in the digital camera and display searched image data on the portable radio communication device.

SUMMARY OF THE INVENTION

The object of the present invention is to enable the communication device to search the imaging device data in the imaging device. Another object of the present invention is to enable the searched image data to be displayed on the communication device.

Another object and the characteristic of the present invention will be clarified by the following specification and the drawings.

DETAILED DESCRIPTION OF THE PREFERRED EMBODIMENTS

In the following, description will be made for the data communication system according to the embodiments of the present invention with reference to the drawings.

Figure 1:
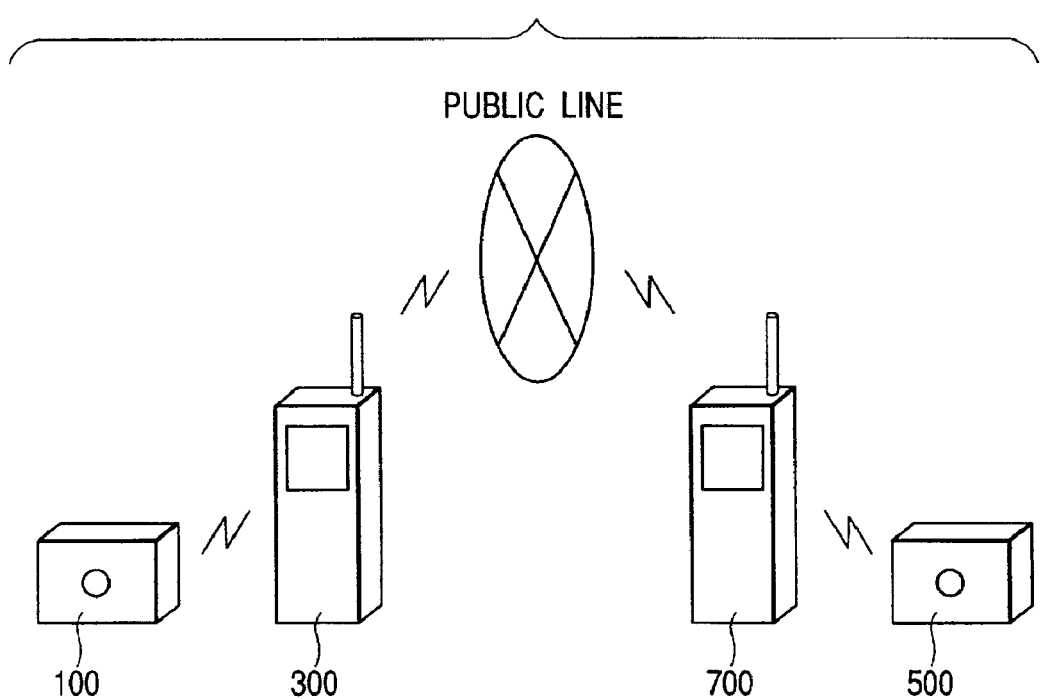
FIG. 1 is a view showing the entire constitution of the data communication system in the present invention.

FIG. 1 is the view showing the entire constitution of the data communication system according to the embodiments of the present invention.

In FIG. 1, imaging devices 100 and 500 are the digital cameras and the like that shoot the image. Communication devices 300 and 700 are the cellular phones and the like that have the telephone function, the E-mail function, the Web browsing function and the like.

Data including a command and an image shot can be transmitted/received with each other between the imaging device 100 and the communication device 300, and between the imaging device 500 and the communication device 700 by radio communication based on the Bluetooth standard. It is to be noted that the radio communication is not limited to the Bluetooth standard but may be the radio communication of other spread spectrum methods.

In addition, the communication device 300 and the communication device 700 can perform the radio communication via a public communication network.

As described, the imaging device 100 and the imaging device 500 can be communicated with each other via the communication device 300 and the communication device 700.

Figure 2:
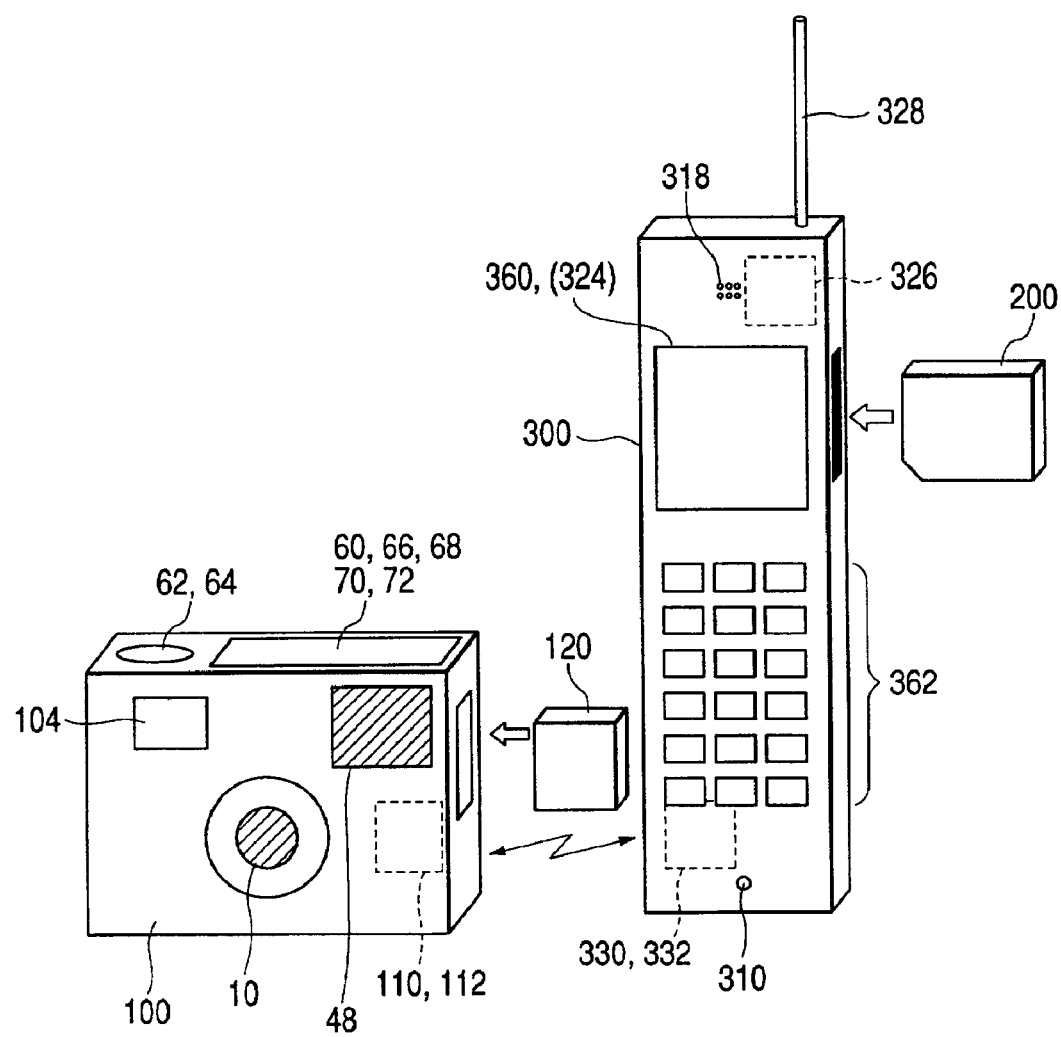
FIG. 2 is an external view of the imaging device and the communication device in the present invention.

FIG. 2 is the external view of the imaging device 100 and the communication device 300 in FIG. 1. It is to be noted that the imaging device 500 and the communication device 700 are same as the imaging device 100 and the communication device 300 severally.

In FIG. 2, the imaging device 100 is equipped with: a flash 48; a mode dial 60; a shutter switches 62 and 64; a single/continuous shots switch 66; a compression mode switch 68; an operation unit 70; a main switch 72; an optical finder 104; communication means 110; an antenna 112; and a shooting lens 10, which will be described later, at each position of the case. Further, the imaging device 100 has a slot in which a recording medium 120 can be housed.

The communication device 300 is equipped with: a microphone 310; a speaker 318; communication means 326; an antenna 328; communication means 330; an antenna 332; a display unit 360; image display means 324; and an operation unit 362, at each position of the case. Further, the communication device 300 has a slot in which a recording medium 200 can be housed.

Figure 3:
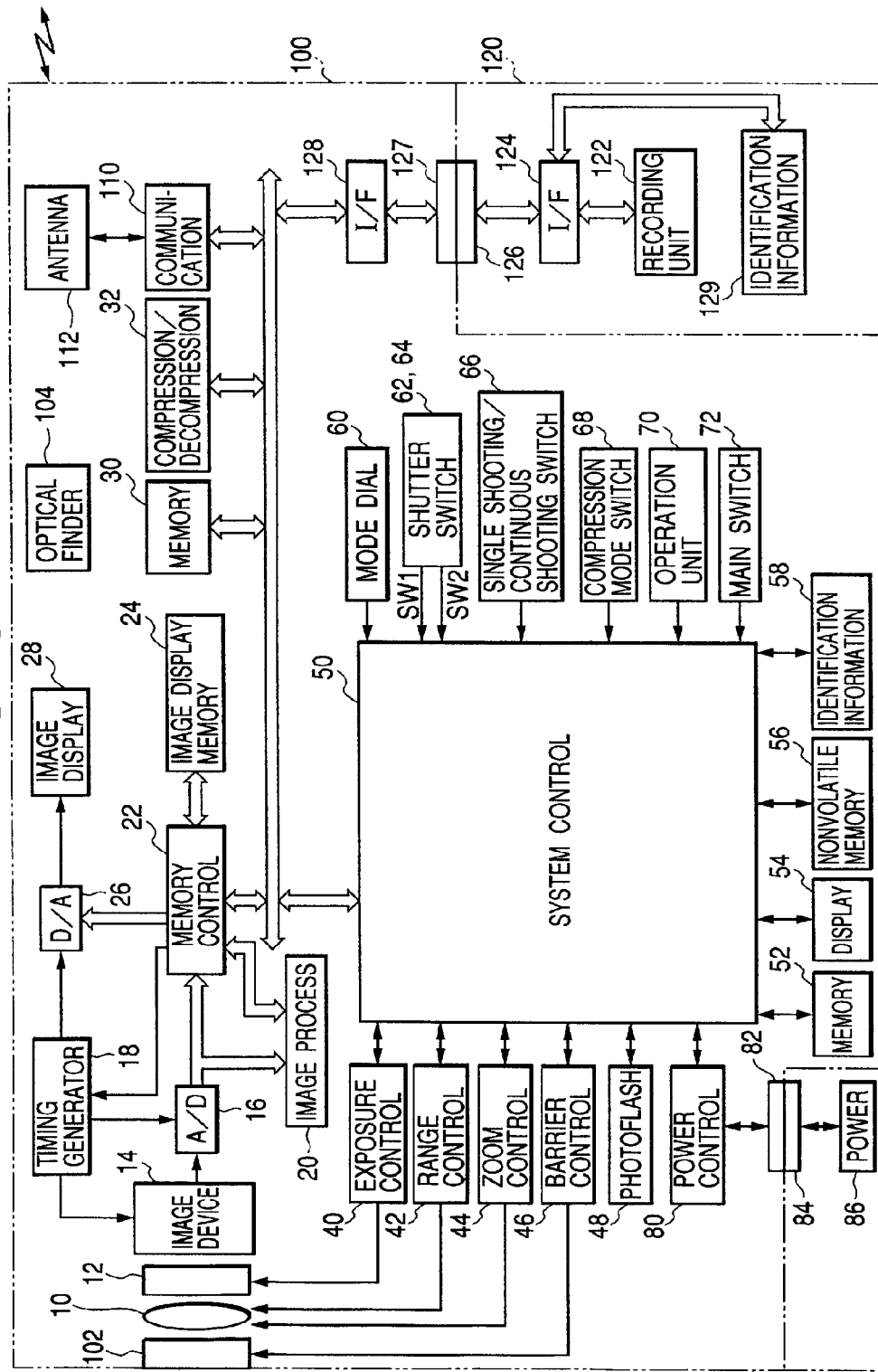
FIG. 3 is a block diagram showing the constitution of the imaging device in the present invention.

The constitution of the imaging device 100 will be described with reference to the block diagram of FIG. 3 as follows. It is to be noted that the imaging device 500 is same as the imaging device 100.

The entire imaging device 100 is controlled by a system control circuit 50.

The shooting lens 10 catches the optical image of a subject.

Protection means 102 is a barrier that prevents a shooting unit from stain and break by covering the shooting unit including the shooting lens 10 of the imaging device 100.

A shutter 12 includes a diaphragm function.

An image device 14 converts the optical image caught via the shooting lens 10 into an analog signal to output it.

An A/D converter 16 converts the analog signal output from the image device 14 into the digital signal.

A D/A converter 26 converts the digital signal into the analog signal.

A timing generator 18 is a circuit that supplies a clock signal and a control signal to the image device 14, the A/D converter 16 and the D/A converter 26.

An image process circuit 20 performs a predetermined pixel interpolation and color conversion processing to the data from the A/D converter 16 or the data from a memory control circuit 22 (described later). Further, the image process circuit 20 performs a predetermined arithmetic processing by using the shot image data, and also performs an AWB (Auto White Balance) processing of a TTL (Through The Lens).

Image display means 28 is constituted of a TFTLCD (Thin Film Transistor Liquid Crystal Display). An electronic finder function can be realized when the images shot by the image display means 28 are sequentially displayed. Further the image display means 28 can arbitrarily turn the display ON/OFF by the instruction of the system control circuit 50, and power consumption of the imaging device 100 can be substantially reduced when the display is turned OFF.

The image data for display is written in an image display memory 24. The image data for display is displayed by the image display means via the D/A converter 26.

A memory 30 is a memory that consists of a volatile memory or a nonvolatile memory for storing a static image or a moving image shot, and has a sufficient memory capacity to store a predetermined number of the static images or a predetermined time of the moving images. Accordingly, a large amount of the images can be written in a high-speed in the case of a continuous shooting and a panoramic shooting where a plurality of the static images are shot. Moreover, the memory also can be used as a working area of the system control circuit 50.

A compression/decompression circuit 32 is a circuit that compresses/decompresses the image data by the applied discrete cosine transformation (ADCT) or the like, and reads the image data stored in the memory 30 to perform a compression processing or an expansion processing, and writes the image data to which the processing has completed in the memory 30.

The memory control circuit 22 controls the A/D converter 16, the D/A converter 26, the timing generator 18, the image process circuit 20, the image display memory 24, the memory 30 and the compression/decompression circuit 32. Further, the image data converted to the digital signal by the A/D converter 16 is written in the memory 30 via the image process circuit 20 and the memory control circuit 22 or directly via the memory control circuit 22.

A photoflash 48 includes a flood function of AF (Auto Focus) auxiliary light and a photoflash dimmer function.

Range control means 42 controls focusing of the shooting lens 10.

Exposure control means 40 controls the shutter 12, and also includes the photoflash dimmer function by working correspondingly with the photoflash 48.

Zoom control means 44 controls zooming of the shooting lens 10.

Barrier control means 46 controls the protection means 102 being the barrier.

It is to be noted that the system control circuit 50 controls the exposure control means 40 and the range control means 42 based on the arithmetic result obtained by the arithmetic processing by the image process circuit 20, and performs the AF (Auto Focus) processing of the TTL (Through The Lens), AE (Auto Exposure) processing and pre-flashing processing.

A memory 52 stores a constant, a variable, a program and the like necessary for operating the system control circuit 50.

Display means 54 is constituted of a liquid crystal display device displaying a character and an image and of a speaker reproducing voice, for example, of the combination of an LCD (Liquid Crystal Display), an LED (Light Emitting Diode), a voice element and the like, and it notifies the user of an operating state and a message in accordance with the program execution in the system control circuit 50. Single or a plurality of the display means 54 is installed in a position near the operation unit of the imaging device 100, which is easily recognized by the user.

A part of the function of the display means 54 is installed in the optical finder 104 (described later). What is displayed on the LCD and the like, for example, are single shot/continuous shoot display, self-timer display, compression ratio display, number of recorded pixels display, number of recorded images display, remaining number of images that can be shot display, shutter speed display, aperture display, exposure correction display, flash display, red-eye reduction display, macro shoot display, buzzer setting display, residual battery amount for clock display, residual battery amount display, error display, information display by a number of plural digits, attaching/detaching state of the recording medium 200, communication I/F operation display and date/time display. Furthermore, what is displayed out of the display contents of the display means 54 in the optical finder 104, for example, are focusing display, hand-swinging warning display, flash charging display, shutter speed display, aperture value display and exposure correction display.

Nonvolatile memory 56 is a memory electrically erasable/recordable, and an EEPROM (Electrically Erasable Programmable Read Only Memory) or the like, for example, is used.

In identification information 58, various kinds of identification information to perform verification prior to communication when communicating with the communication device 300 via the communication means 110 (described later) and the antenna 112.

The mode dial switch 60, the shutter switch SW1/62, the shutter switch SW2/64, the single/continuous shot switch 66, the compression mode switch 68, the operation unit 70 and the main switch 72 are means for entering various operation instructions of the system control circuit 50, and are constituted of the combination of a single or a plurality of switches, dials, touch panels, pointing by a line of sight detection, voice recognition devices and the like.

The main switch 72 can set the switching of power on and power off of the imaging device 100.

The mode dial switch 60 can set the switching of various function modes such as an automatic shooting mode, a shooting mode, a panoramic shooting mode, a reproduction mode, a multi-screens reproduction/erasing mode and a PC (Personal Computer) connection mode.

The shutter switch SW1/62 turns ON in the middle of operating a shutter button (not shown) to instruct start of operations such as the AF processing, the AE processing, the AWB processing and the pre-flashing processing.

The shutter switch SW2/64 turns ON on completion of operating the shutter button (not shown) to instruct the starting of a series of processing where an exposure processing is performed in which the image data of the signal read out from the image device 14 is written in the memory via the A/D converter 16 and the memory control circuit 22, a development processing is performed using an operation in the image process circuit 20 and the memory control circuit 22, the image data from the memory 30 is read out to be compressed in the compression/decompression circuit 32, and the image data is written in the recording medium 200.

The single/continuous switch 66 can set the single shot mode in which one frame is shot to be in a stand-by state when the shutter switch SW2/64 is pressed and the continuous shot mode in which continuous shooting is performed while the shutter switch SW2/64 is being pressed.

The compression mode switch 68 can select either the compression ratio of the JPEG (Joint Photographic Experts Group) compression or the CCDRAW mode in which the analog signal output from the image device 14 is converted into the digital signal to record in the recording medium.

The operation unit 70 is constituted of various buttons, switches and touch panels. The various buttons, for example, are a menu button, a setting button, a macro button, a multi-screen reproduction page ejection button, a flash setting button, a self-timer button, a move menu + (plus) button, a move menu – (minus) button, a shooting image quality selection button, an exposure correction button and a data/time setting button. It is to be noted that a numerical value and a function can be selected more swiftly by installing a rotating dial switch regarding each function of the foregoing plus button and minus button. Further, the switches, for example, are: a reproduction switch that can set each function mode such as a reproduction mode, a minus screen reproduction/erasing mode, a PC connection mode; an AF mode setting switch that can set a one shot AF mode, in which an auto focusing operation starts by pressing the shutter switch SW1/62 and a focusing state is kept once the image is focused, and a servo AF mode, in which the auto focusing mode continues while the shutter switch SW1/62 is being pressed; an image display ON/OFF switch that sets ON/OFF of the image display means 28; and a quick review ON/OFF switch that sets a quick review function that automatically reproduces the image data shot immediate after the shooting has stared.

Power control means 80 is constituted of a battery detection circuit, a DC/DC converter, a switching circuit and the like, detects with/without attaching the battery, the kind of the battery and the residual amount of the battery, controls the DC/DC converter based on a detection result and the instruction to the system control circuit 50, and supplies a necessary voltage to each unit including the recording medium for a necessary period of time.

Power 86 is constituted of a primary battery such as an alkaline battery and a lithium battery, a secondary battery such as a NiCd battery, a NiMH battery (Nickel Metal Hydride battery) and a Li-Ion battery, an AC adapter and the like.

Connectors 82 and 84 connect the power control circuit 82 and the power 86.

The optical finder 104 can shoot the image only by itself without using an electronic finder function by the image display means 28. Furthermore, a part of the function of the display means 54, for example, the focusing display, the hand-swinging warning display, the flash charging display, the shutter speed display, the aperture value display, the exposure correction display and the like are installed.

The communication means 110 includes the radio communication means based on the Bluetooth standard. It is to be noted that the present invention can be realized not only by the radio communication based on the Bluetooth standard but also by various kinds of short range high-speed data radio communication by other spread spectrum communication. The communication means 110 can transfer the image data and control information (an image data name, a picture date, a camera type of the imaging device that shot the image data, a shooting location, a keyword regarding the image data) attached to the image data.

The antenna 112 connects the imaging device 100 with other devices via the communication means 110.

An interface 128 takes control of interface with the recording medium 120, and a connector 127 is connected with the recording medium 120. It is to be noted that, in this embodiment, description is made for one system of the interface 128 and the connector 127 to which the recording medium is attached. But, the interface 128 and the connector 127 to which the recording medium is attached may be constituted of either single system or a plurality of systems. Alternatively, the constitution may be the combination of the interface 128 and the connector 127 of the different standards. The interface 128 and the connector 127 may be constituted using the ones that conform to the standard of the PCMCIA (Personal Computer Memory Card International Association) card, the CF (Compact Flash) card, the MMC (Multi Media Card) and the like. In the case where the interface 128 and the connector 127 are constituted of the ones that conform to the standard of the PCMCIA card, the CF card and the like, the image data and control information (the image data name, the picture date, the camera type of the imaging device that shot the image data, the shooting location, the keyword regarding the image data) attached to the image data can be transferred with other computers and peripheral equipments such as a printer by connecting various kinds of communication cards such as a LAN card, a modem card, a USB card, an IEEE (Institute of Electrical and Electronic Engineers) 1394 card, a P1284 card, a SCSI (Small Computer System Interface) card and a card for a PHS (Personal Handy phone System).

The recording medium 120 is constituted of a memory card and a hard disc or the like. Furthermore, the recording medium 120 comprises: a recording unit 122 constituted of a semiconductor memory, a magnetic disc or the like; an interface 124 with the imaging device 100; a connector 126 connected with the imaging device 100; and identification information 129.

With the foregoing constitution, the imaging device 100 stores the image data shot through the shooting lens 10 in the recording medium 120, and can transmit the image data to the communication device 300 via the communication means 110 and the antenna 112.

Figure 4:
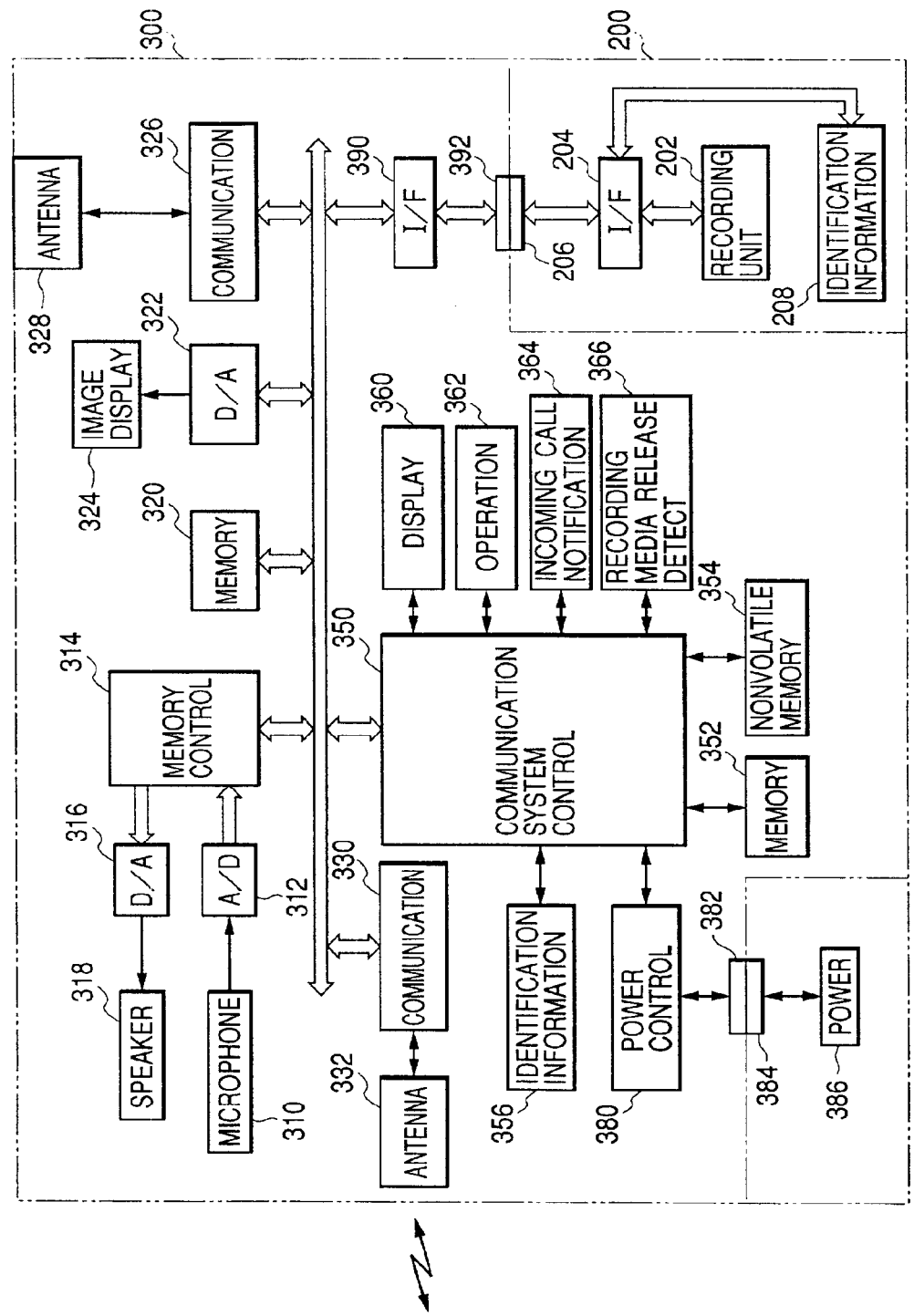
FIG. 4 is a block diagram showing the constitution of the communication device in the present invention.

Next, description will be made for the constitution of the communication device 300 referring to the block diagram of FIG. 4.

A microphone 310 outputs voice entered after converting into the analog signal.

An A/D converter 312 converts the analog signal output from the microphone 310 into the digital signal.

A D/A converter 316 converts the digital signal into the analog signal.

A speaker 318 converts the analog signal into voice.

A memory 320 stores the voice entered to the microphone 310 and the static image data and moving image data received from the imaging device 100. Furthermore, the memory 320 has a sufficient memory capacity to store a predetermined number of the static images or a predetermined time of the moving images.

A memory control circuit 314 controls writing of the data output from the A/D converter 312 to the memory 320 and reading of the data from the memory 320, and controls entry of the data read out from the memory 320 to the D/A converter 316.

A D/A converter 322 converts the static image data and the moving image data stored in the memory 320 into the analog signal.

Image display means 324 displays the static image and the moving image based on the analog signal output from the D/A converter 322.

Communication means 326 includes a long-range radio communication function by a TDMA (Time Division Multiple Access), a CDMA (Code Division Multiple Access), W-CDMA (Wide-band Code Division Multiple Access) and the like.

An antenna 328 connects the communication device 300 in a circuit with the communication device 700 and a communication base station by the communication means 326.

Communication means 330 includes the radio communication function based on the Bluetooth standard. Not that the present invention can be realized not only by the radio communication based on the Bluetooth standard but also by various kinds of short range high-speed data radio communication by other spread spectrum communication.

An antenna 332 connects the communication device 300 with other devices by the communication means 330.

Communication system control circuit 350 controls the entire communication device 300.

A memory 352 stores a constant, a variable, a program and the like necessary for operating the system control circuit 350.

A nonvolatile memory 354 is an electrically erasable memory, and the EEPROM or the like is used for example.

In identification information 356, various kinds of identification information to perform verification prior to communication when communicating with the imaging device 100 via the communication means 330 and the antenna 332.

Display means 360 is constituted of the liquid crystal display device displaying the character and the image and of the speaker reproducing voice, for example, of the combination of the LCD, the LED, the voice element and the like, and it notifies the user of the operating state and the message in accordance with the program execution in the communication system control circuit 350. Single or a plurality of the display means 360 is installed in the position near the operation unit of the communication device 300, which is easily recognized by the user.

Operation means 362 is for entering various kinds of operation instruction of the communication system control circuit 350, and is constituted by combining the switches, the dials, the touch panels, the pointing by a line of sight detection, the voice recognition devices and the like by single number and plural numbers. ON/OFF of the power of the communication device 300, execution/discontinuance (off hook/on hook) of conversation, entry of a telephone number, search of the telephone number, switching of the communication mode and the like can be performed by the operation means 362.

An incoming call notification means 364 notifies the user of the communication device 300 of receiving the incoming call from another communication device or communication base station by a calling sound, voice, sound such as music, an image such as an icon, a moving image, a static image and an illumination, or vibration.

A recording media release detection means 366 detects whether or not the recording medium 200 is attached to a connector 392 (described later).

A power control means 380 is constituted of the battery detection circuit, the DC/DC converter, the switching circuit that switches a block to be energized and the like, and detects with/without attaching the battery, the kind of the battery and the residual amount of the battery, controls the DC/DC converter based on a detection result and the instruction of the communication system control circuit 350, and supplies the necessary voltage to each unit including the recording medium 200 for the necessary period of time.

Power means 386 is constituted of the primary battery such as the alkaline battery and the lithium battery, the secondary battery such as the NiCd battery, the NiMH battery and the Li-Ion battery, the AC adapter and the like.

Connectors 382 and 384 connect the power control circuit 380 and the power 386.

An interface 390 takes control of interface with the recording medium 200, and a connector 392 is connected with the recording medium 200. It is to be noted that, in this embodiment, description is made for one system of the interface 390 and the connector 392 to which the recording medium 200 is attached. But, the interface 390 and the connector 392 to which the recording medium 200 is attached may be constituted of either single system or a plurality of systems. Alternatively, the constitution may be the combination of the interface 390 and the connector 392 of the different standards. The interface 390 and the connector 392 may be constituted using the ones that conform to the standard of the PCMCIA card, the CF card, the MMC and the like. In the case where the interface 390 and the connector 392 are constituted of the ones that conform to the standard of the PCMCIA card, the CF card and the like, the image data and control information attached to the image data can be transferred with other computers and peripheral equipments such as a printer by connecting various kinds of communication cards such as a LAN card, a modem card, a USB card, an IEEE 1394 card, a P1284 card, a SCSI card and a card for a PHS.

The recording medium 200 is constituted of the memory card and the hard disc or the like. Furthermore, the recording medium 200 comprises: a recording unit 202 constituted of the semiconductor memory, the magnetic disc or the like; an interface 204 with the communication device 300; a connector 206 connected with the communication device 300; and identification information 208.

With the foregoing constitution, the communication device 300 receives the image data from the imaging device 100 via the communication means 330 and the antenna 332, and can store the image data in the detachable recording medium 200 and display the data on the image display means 324. Further, the communication device 300 can transmit the image data to the communication device 700 or the communication base station by a public communication network via the communication means 326 and the antenna 328, and furthermore, can transmit the image data to the imaging device 500 via the devices.

In the following, description will be made for the image data search processing executed by the communication device 300 and the imaging device 100 according to the embodiment of the present invention.

Figure 5:
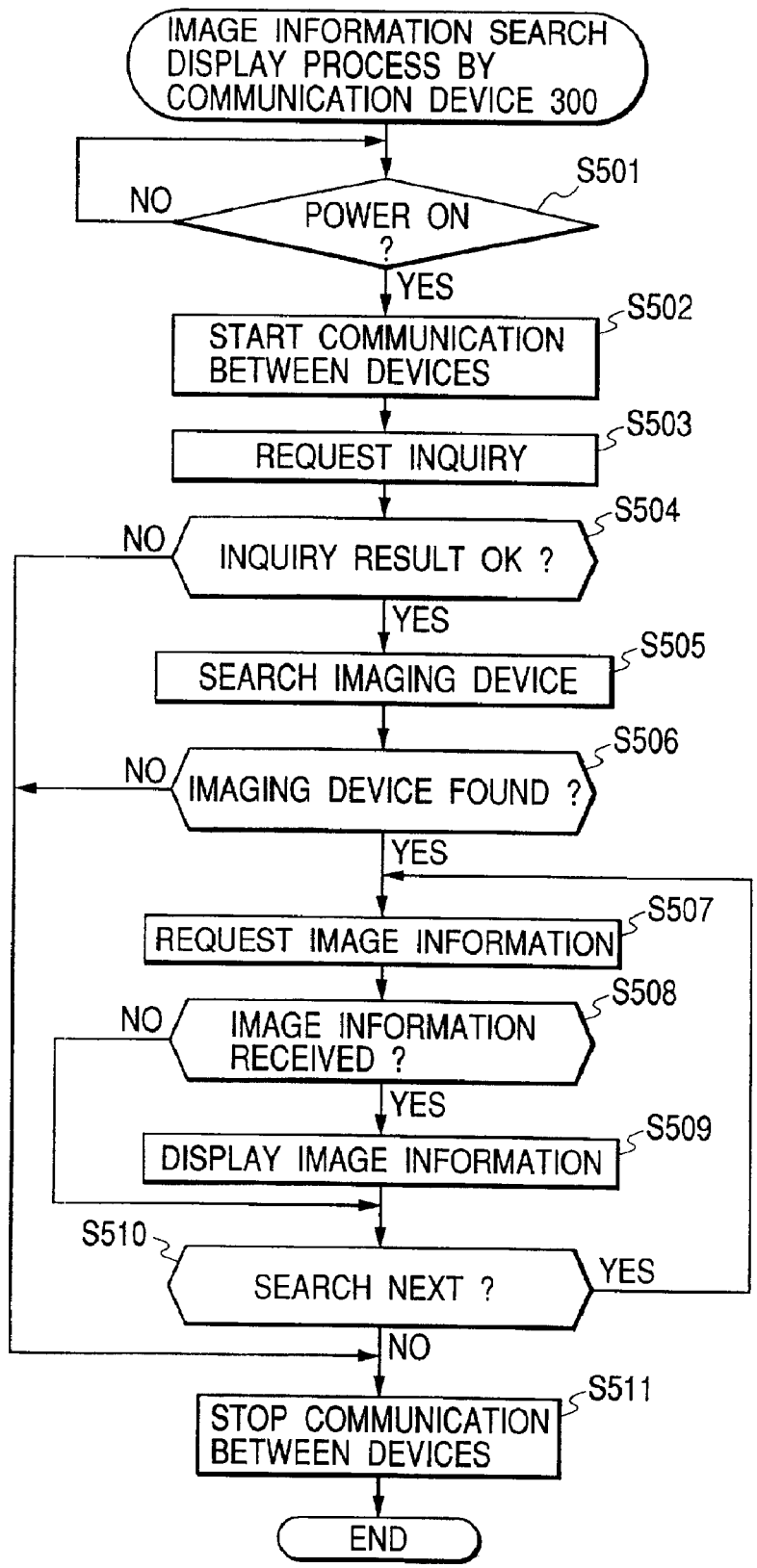
FIG. 5 is a flowchart showing image data search processing executed by the communication device in the present invention.

FIG. 5 is a flowchart explaining the image data search processing executed by the communication device 300.

Firstly, the communication device 300 concludes whether or not the power is ON or OFF (step S501).

When the power is concluded to be ON in step S501, the communication device 300 activates the radio communication based on the Bluetooth standard (step S502).

The communication device 300 transmits an "inquiry request" to confirm if there is a device with which it can communicate in the vicinity thereof (step S503).

Based on the result of the inquiry in step S503, the communication device 300 concludes if there was the device with which it can communicate (step S504).

Figure 7:
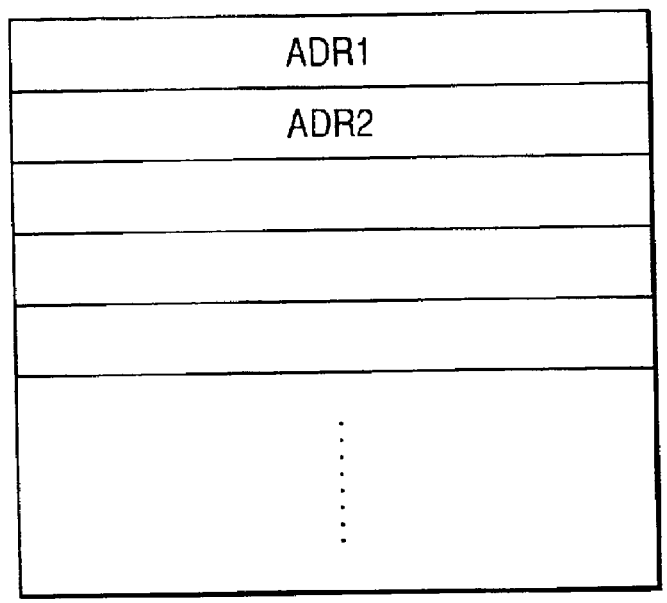
FIG. 7 is a view showing the address of the imaging device stored in the memory of the communication device.

If it is concluded that there were devices with which communication can be performed, the communication device 300 searches an objective imaging device 100 among the devices (step S505). The search is performed by comparing the address received from the device with which communication can be performed and the address ADR (refer to FIG. 7) of the imaging device 100 stored in the memory 352 of the communication device 300. Alternatively, the search may be performed by displaying the devices with which communication can be performed on a list, and selecting the imaging device from the list by the user.

On step S505, the communication device 300 concludes if the objective imaging device 100 was searched (step S506).

If it is concluded that the imaging device was searched in step S506, the communication device 300 is connected with the image by an active mode of the radio communication based on the Bluetooth standard. Then, the communication device 300 transmits search information to search one or a plurality of images among a plurality of the images stored in the image display memory 24 of the imaging device 100, and requests to transmit the image data searched (step S507).

In other words, in step S507, the communication device 300 transmits the search information that designates any condition of the file name, the date, the camera type, the position information and the keyword to the imaging device 100, and requests the imaging device 100 of transmitting the image data searched based on the search information. It is to be noted that the search information to be transmitted may be one or a plural numbers.

The communication device 300 concludes if it received the image data corresponding to the request made in the step S507 (step S508).

If it is concluded that the data was received in step S508, the communication device 300 displays the received image data on the image display means 324 (step S509).

It is to be noted that when reduction processing is performed to the image data received in step S508, the communication device 300 displays the image data to which the reduction processing was performed on the image display means 324 on a list. The file name (a file number added when a reduced image was formed, a file name of the image data corresponding to the reduced image or the like) is added to the reduced image. When the user selects the image data in the displayed list, the communication device 300 notifies the imaging device 100 of the file name of the selected image data. Then, the communication device 300 receives the image data to which the reduction processing is not performed to display on the image display means 324.

Furthermore, when the reduction processing is not performed to the image data received in step S508 in the imaging device 100, the communication device 300 may display the image data on the list after performing the reduction processing to the image data. Then, the image data selected before the reduction processing was performed may be displayed when the user selects a particular image data. Herein, whether or not the reduction processing is performed to the image data may be determined in accordance with the number of the image data received.

In the case where the image data is displayed on a list on the image display means 324, the size of each image data may be changed accordingly to the number of the image data.

Instead of displaying on a list, the image data may be sequentially displayed such that the image data received first is displayed and the image data received next is displayed when the user gives a display instruction to the image data received next.

In addition, to notify the user of whether the reduction processing is performed to the image data, the image data is displayed added with a mark, a message or the like showing that the reduction processing is performed.

The communication device 300 concludes whether or not the next image data shall be searched (step S510).

When it is concluded that the next image data is searched in step S510, a series of the processing from step S507 is repeated.

If it is concluded that the next image data is not searched in step S510, the radio communication based on the Bluetooth standard is discontinued (step S511) to complete the processing.

As described, the communication device 300 can search the image data stored in the image display memory 24 of the imaging device 100 by transmitting the search information to the imaging device 100. The communication device 300 also can receive the searched image data from the imaging device 100.

Figure 6:
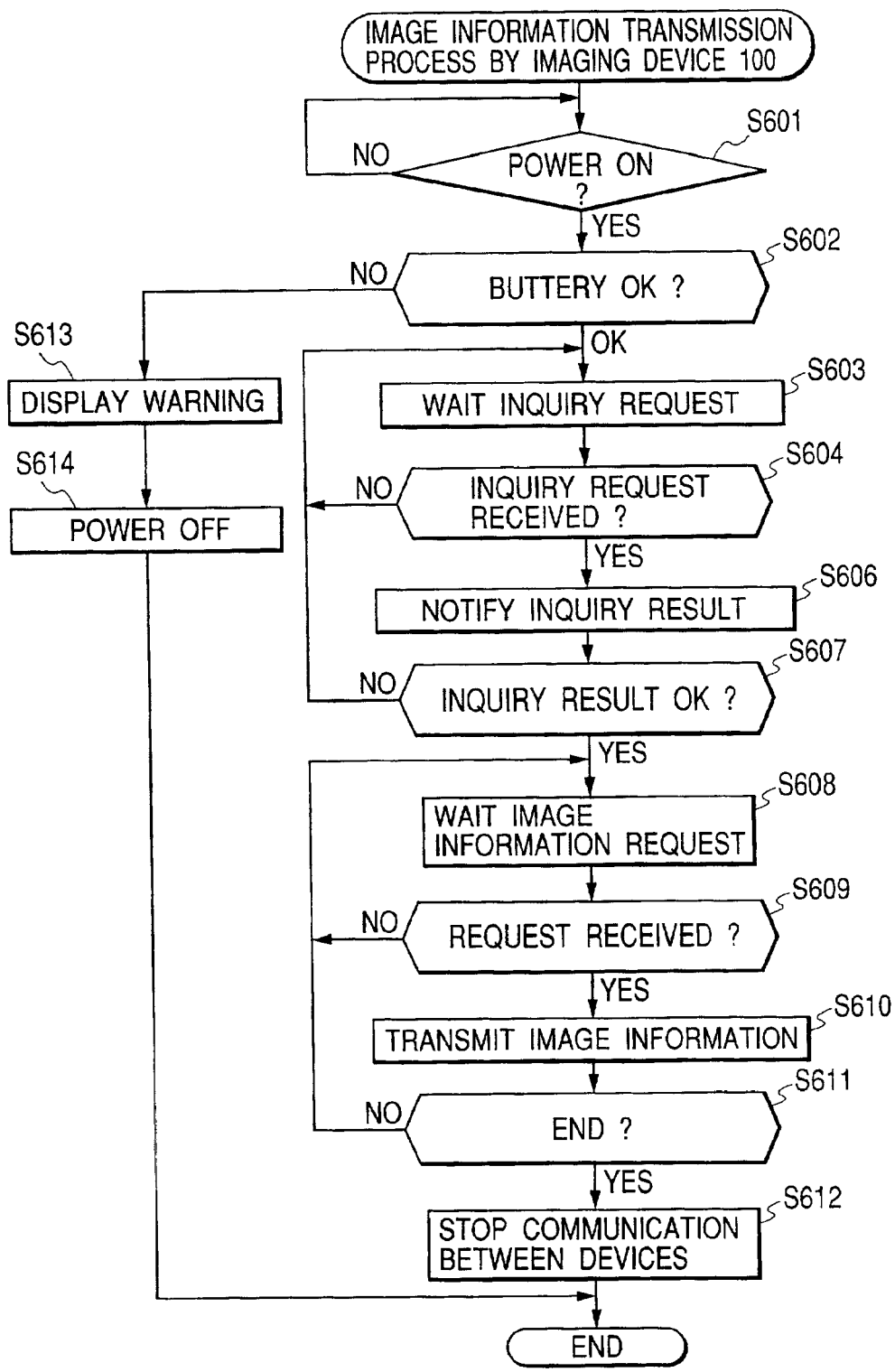
FIG. 6 is a flowchart showing image data transmission processing executed by the imaging device in the present invention.

FIG. 6 is a flowchart explaining the image data transmission processing executed by the imaging device 100. It is to be noted that the processing described as follows is performed in the case where the primary battery such as the alkaline battery and the lithium battery or the secondary battery such as the NiCd battery, the NiMH battery and the Li-Ion battery is used as the power 86 of the imaging device 100 instead of the AC adapter.

Firstly, the imaging device 100 concludes if the power 86 is ON or OFF (step S601).

When the power 86 is concluded to be ON in step S601, the imaging device 100 concludes if the residual amount of the battery of the imaging device 100 is sufficient (step S602).

When it is concluded that there is a sufficient residual amount of the battery in step S602, the imaging device 100 activates the radio communication based on the Bluetooth standard to be in a waiting state for the inquiry request (step S503 of FIG. 5) from the communication device 300 (step S603).

The imaging device 100 concludes if the inquiry request from the communication device 300 is received (step S604).

When it is concluded that the inquiry request was received in step S604, the imaging device 100 transmits a response to the inquiry to the communication device 300 (step S606).

Then, the imaging device 100 concludes if it is connected with the communication device 300 by the active mode of the radio communication based on the Bluetooth standard (step S607).

When it is concluded that the imaging device 100 was connected with the communication device 300 by the active mode of the radio communication based on the Bluetooth standard, the imaging device 100 is made to be in a waiting state for the image data request (step S507 of FIG. 5) from the communication device 300 (step S608).

It is to be noted that the imaging device 100 may notify the communication device 300 of a searchable condition to enable the communication device 300 to receive the search information in accordance with the condition. In this case, the searchable condition may be displayed on the display unit 360 of the communication device 300. For example, if the imaging device 100 can search by the file name and the picture date, the imaging device notifies the communication device 300 of the condition, and the communication device 300 displays that the search by the file name and the picture date on the display unit 360.

The imaging device 100 concludes if the image data request was received (step S609).

Figure 8:
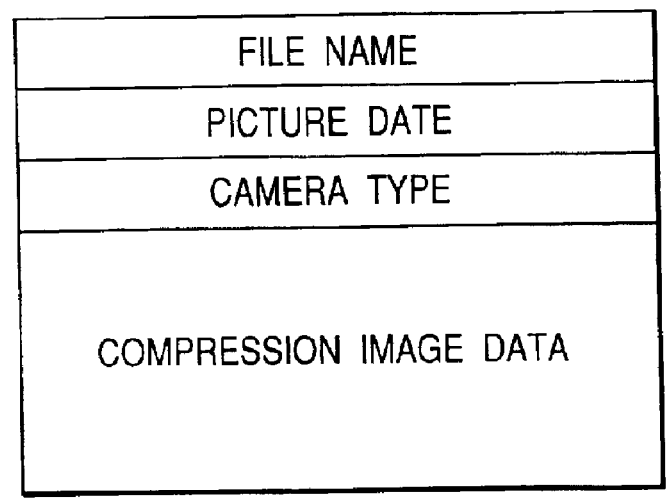
FIG. 8 is a view showing format of the image data stored in the memory of the imaging device.

When it is concluded that the image data request was received from communication device 300 in step S609, the imaging device 100 searches the image data stored in the image display memory 24 based on the search information received together with the image data request and the control information of the image data stored in the image display memory 24. Herein, an example of an image data format is shown in FIG. 8. The image data includes the control information such as the file name, the picture date and the camera type of the imaging device 100 and the shot image data. In addition, although not shown, when the shooting position can be automatically recognized in the imaging device 100 by position information of a GPS (Global Positioning System) or the base station of the public radio communication or when the position information can be entered from the operation unit, information regarding the shooting position may be included in the control information. Further, the control information may include the keyword when the keyword of the shot image data can be entered.

Then, the imaging device 100 transmits the searched image data to the communication device 300 (step S610). All searched image data is transmitted to the communication device when a plurality of the image data are searched.

It is to be noted that the reduced image of the searched data is formed, and the file name (the file number added when the reduced image was formed, the file name of the image data corresponding to the reduced image or the like) may be added to each reduced image and transmitted to the communication device 300. Then, when the imaging device 100 receives the file name from the communication device 300, the image data corresponding to the file name, to which the reduction processing is not performed, may be transmitted to the communication device 300.

In addition, whether or not the reduced image of the image data is formed may be determined in accordance with the number of the image data searched.

The imaging device 100 concludes if transmission of the image data completed (step S611).

When it is concluded that the transmission of the image data was completed, the radio communication based on the Bluetooth standard discontinues (step S612) to complete the processing.

On the other hand, if it is concluded that there is not a sufficient residual battery amount in step S602, a warning such as "Image data cannot be searched" is displayed on the display means 54 (step S613). Accordingly, this display prevents the battery from running out in the middle of the search and causing the search to be incomplete, and prevents the battery from running out in the middle of the image data transmission of the search result even if the search is completed. It is to be noted that the imaging device 100 may be designed to be able to shoot the subject although the search processing cannot be executed.

Then, the power 86 is turned OFF (step S614) to complete the processing.

As described, the imaging device 100 searches the image data stored in the image display memory 24 in accordance with the search request from the communication device 300, and can transmit the searched image data to the communication device 300.

Also, it is needless to say that the present invention can be applied to the case where the recording medium storing a program module of the software that realizes the foregoing embodiment is achieved by supplying the program to the system or the device. In this case, the program module itself read out from the recording medium realizes the novel function of the present invention, and the recording medium storing the program constitutes the present invention.

In the foregoing embodiment, the program module is stored in memory 52 of the imaging device 100 and the memory 352 of the communication device 300. Various kinds of the recording media supplying the program module such as a floppy disc, a hard disc, an optical disc, a magneto-optic disc, a CD-ROM, an MO, a CD-R, a DVD, a magnetic tape, a nonvolatile memory card and the like are conceived. However, the recording medium is not limited to a particular kind, and any one is acceptable as long as it can store the foregoing program.

Regarding the imaging device, the present invention can be realized not only by the digital camera but also by a video camera. Furthermore, in the case of transmitting voice data instead of the image data, the present invention can be realized by replacing the imaging device with a voice recorder such as an MD recorder.

Moreover, with regard to the communication device, the present invention can be realized not only by the cellular phone but also by electronic equipment such as a notebook PC and a PDA (Personal Digital Assistance) having a communication function.

What is claimed is:

1. A data communication system comprising:
 a communication apparatus including transmission means for transmitting search information; and
 an imaging apparatus including:
 storage means for storing a signal obtained by imaging a subject as data into a memory;

reception means for receiving the search information;

search means for searching the data from the memory on the basis of the search information;

transmission means for transmitting information regarding the data searched by said search means;

detection means for detecting a residual battery amount; and notification means for notifying that searching by said search means is impossible and that storing by said storage means is possible, based on the detection results by said detection means.

2. An imaging device comprising:

storage means for storing a signal obtained by imaging a subject as data into a memory;

reception means for receiving, from an external device, search information for searching the data;

search means for searching the data stored in the memory on the basis of the search information received by said reception means;

transmission means for transmitting, to the external device, information regarding the data searched by said search means;

detection means for detecting a residual battery amount; and notification means for notifying that searching by said search means is impossible and that storing by said storage means is possible, based on the detection results by said detection means.

3. An imaging device according to claim 2, further comprising:

reduction processing means for performing reduction processing to the data searched by said search means, wherein information regarding said searched data is data to which the reduction processing has been performed by said reduction processing means.

4. An imaging device according to claim 3, further comprising:

second reception means for receiving information regarding data selection based on the data to which the reduction processing has been performed by said reduction processing means, wherein said transmission means transmits data corresponding to the information received by said second reception means without performing the reduction processing.

5. An imaging device according to claim 3, wherein said reduction processing means performs said reduction processing in accordance with the number of the data searched by said search means.

6. An imaging device according to claim 2, wherein said search information is any one of a data name, a picture date, a camera type of an imaging device that shot an image, a shooting position and a keyword regarding said data.

7. An imaging device according to claim 2, wherein said storage means stores an attribute of data along with said data.

8. An imaging device according to claim 7, wherein the attribute of said data is any one of a data name, a picture data, a camera type of an imaging device that shot an image, a shooting position and a keyword regarding said data.

9. An imaging device according to claim 2, wherein said reception means and said transmission means are performed by radio communication.

10. An imaging device according to claim 9, wherein said radio communication is based on the Bluetooth standard.

11. An imaging device according to claim 2, wherein said imaging device is any one of a digital camera and a video camera.

12. A communication device according to claim 2, wherein the external device is a cellular phone.

13. A search method of searching data stored in an imaging device, comprising the steps of:

storing a signal obtained by imaging a subject as data in a storage unit of said imaging device;

receiving, from an external device, search information to search said stored data;

searching the data stored in said storage unit on the basis of said received search information;

transmitting, to the external device, information regarding said searched data;

detecting a residual battery amount; and notifying that searching by said searching step is impossible and that storing by said storing is possible, based on the detection result in said detecting step.

14. A storage medium storing a program for executing a process of searching data stored in an imaging device, the program storing:

a step of storing a signal obtained by imaging a subject as data in a storage unit of said imaging device;

a step of receiving, from an external device, search information to search said stored data;

a step of searching the data stored in said storage unit on the basis of said received search information;

a step of transmitting, to the external device, information regarding said searched data;

a step of detecting a residual battery amount; and a step of notifying that searching by said searching step is impossible and that storing by said storing is possible, based on the detection result in said detecting step.

* * * * *

UNITED STATES PATENT AND TRADEMARK OFFICE
CERTIFICATE OF CORRECTION

PATENT NO. : 7,123,935 B2
APPLICATION NO. : 09/957248
DATED : October 17, 2006
INVENTOR(S) : Takumi Takahashi It is certified that error appears in the above-identified patent and that said Letters Patent is hereby corrected as shown below:

On the Title Page, Item (57)
ABSTRACT
Line 1, "transmit" should read -- transmits --.

DRAWINGS:
Sheet 6, Figure 6, "BUTTERY" should read -- BATTERY --.

COLUMN 1:
Line 20, "form" should read -- from --.

COLUMN 2:
Line 61, "a shutter" should read -- shutter --.

COLUMN 5:
Line 61, "immediate" should read -- immediately --; and
Line 62, "stared." should read -- started. --.

Signed and Sealed this

Tenth Day of July, 2007

JON W. DUDAS
*Director of the United States Patent and Trademark Office*